March 31, 1925.                                                    1,531,629
G. O. SQUIER
APPARATUS FOR ELECTRICAL SIGNALING
Filed Aug. 6, 1920

Inventor
George O. Squier
By Robert H. Young
Attorney

Patented Mar. 31, 1925.

1,531,629

UNITED STATES PATENT OFFICE.

GEORGE O. SQUIER, OF WASHINGTON, DISTRICT OF COLUMBIA.

APPARATUS FOR ELECTRICAL SIGNALING.

Application filed August 6, 1920. Serial No. 401,647.

*To all whom it may concern:*

Be it known that I, GEORGE O. SQUIER, a citizen of the United States of America, residing at Washington, in the District of Columbia, have invented a certain new and useful Apparatus for Electrical Signaling, of which the following is a specification.

This invention relates to the art of electrical communication, telephony and telegraphy, and a system for use in practicing the same.

The object of the present invention is to eliminate the return conductor in electrical communication systems, reducing thereby the cost of installations and simplifying the equipment required. A further object of the invention is to afford improved utilization of apparatus and other means for affecting electrical signaling.

In this invention an entirely new departure is made in which open circuits are used, connecting two communicating stations by a single conductor in air, in water, or in the earth, but the ends of which are free from earth connection, thus constituting an open circuit, and utilizing the potential developed on the conductor to actuate a potentially operated indicator.

In my patent application Serial No. 352,651, I have described a method of electrical signaling over a bare conductor submerged in water or buried in the earth in which there is a ground connection at the transmitting end and the receiving end open, and utilizing a potentially operated indicating instrument.

This invention is a further improvement resting on the discovery that electrical communication can be maintained between stations over a single conductor entirely free from any earth connections at either end. The principle involved is that of establishing a potential wave at one end of the conductor, guiding it along the conductor and adopting some suitable means for detecting the potential wave at the other end of the conductor. This is in a sense a combination of wire and wireless signaling in that it involves the utilization of wave energy which is guided in a definite path along a conductor and it also combines the advantages of both systems; the utilization of wave energy making it possible to use only a single conductor and also accomplishing multiplexing, while the use of a conducting guide of the wave energy insures the same secrecy in communication as is obtained in ordinary wire telephony or telegraphy.

The principle of operation and the method of using my invention can be better understood by reference to the accompanying diagrammatic figures which show typical embodiments of the invention and form part of this specification.

Figure 1:
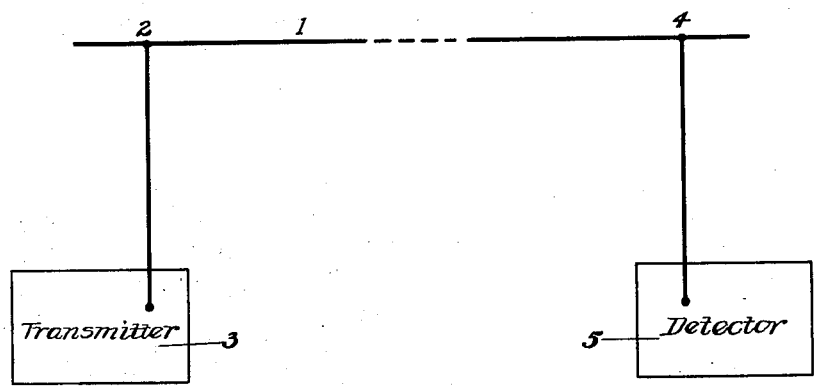
Figure 1 is the diagrammatic view of this system for carrying out the invention in which the transmitting source and the indicating device are connected at the two ends of the line.

Having more particular reference to the drawings and in connection with which like characters of reference will designate corresponding parts, in Figure 1, line 1 is connected at point 2 to an alternating current potential source 3, and at point 4, the line 1 is connected to an indicating device 5. The principle of operation is briefly as follows: Connecting a potential source 3 to the conductor 1 sets up a potential wave which is propagated along the conductor, and its effect noted at any desirable point on the conductor by connecting a suitable potentially operated device at that point. For best results it is preferable to use high frequencies so that either the wave length employed or the length of the line may be readily adjusted so that the length of the line may be some multiple of the wave length of the potential employed and the detector connected to a loop of potential point on the line thereby obtaining a higher sensitivity. The alternating potential source may be any one of the well known types; an electron tube oscillator, an alternator, or an arc, or any other arrangement by means of which an alternating potential of any desired frequency may be impressed upon the line. The conductor connection to the line may be direct as shown in the figure, or any other electrical connection—electrostatic or electromagnetic.

Figure 2:
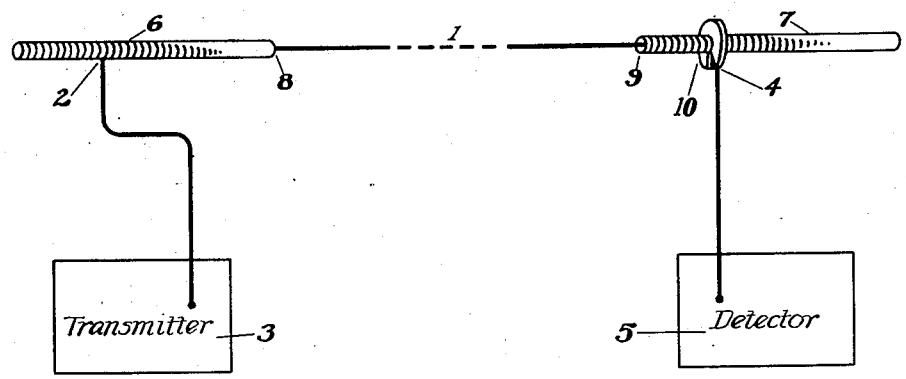
Figure 2 shows a modified arrangement in which resonance wave coils are inserted at both ends of the line for tuning purposes and for locating potential maximum; and, Figure 3 is a further modification illustrating the wire submerged in water but having both ends thereof free or open.

In Figure 2 the modified arrangement is shown in which two resonance wave coils 6 and 7 are connected at both ends of the line, the transmitting source 3 is connected at point 2 to resonance wave coil 6 and the indicating instrument 5 is connected electrostatically through a sliding metal ring 10 to resonance wave coil 7. The connections of the transmitting source 3 and detecting instrument 5 are adjustable on the two respective wave coils 6 and 7. The purpose of the resonance wave coils in the circuit is to enable the adjustment of the wave length of the conductor system so as to bring it into resonance with the wave length of the potential source. The detector connection can be adjusted so as to be at the loop of potential point on the coil 7.

Figure 3:
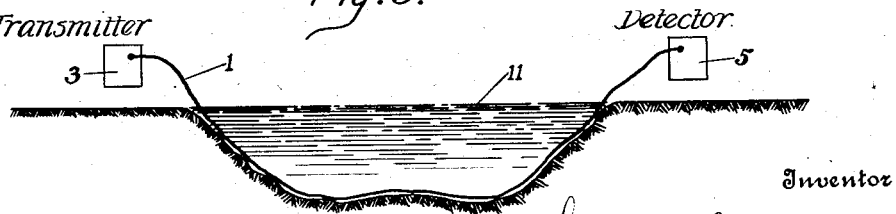

It is to be understood that the line 1 may be, if desired, submerged in a body of water as shown in the Figure 3 designated at 11, the opposite ends of such line having connection with a transmitting source 3 and a detecting instrument 5, but, obviously, being open, that is, having no connection in any manner with the earth.

Whereas I have described my invention by particular reference to specific procedure and specific apparatus, it will be understood that many changes and modifications may be made without departing from my invention, as defined in the appended claim.

I claim:

A system of electrical signaling comprising a single conductor open at both ends and entirely disconnected from the earth, a pair of resonance wave coils, one of said coils being connected to each end of said conductor, a source of alternating current potential of desired frequency connected to said conductor, means for modulating said alternating potential source including means for setting up wave developments along said conductor, said alternating source being connected to a point on one of said resonance wave coils, and means for detecting separately the potential effects of each of said potential waves at the receiving points of the conductor, said last named means comprising a potentially operated detector connected to a point on the other of the two said resonance wave coils.

GEORGE O. SQUIER.